United States Patent [19]
Coussemacq et al.

[11] Patent Number: 4,971,395
[45] Date of Patent: Nov. 20, 1990

[54] FOLDABLE SEAT AND IN PARTICULAR A REAR SEAT OF A MOTOR VEHICLE

[75] Inventors: Jean-Marc Coussemacq, Valentigney; Francois Fourrey, Montebeliard, both of France

[73] Assignee: ECIA - Equipements Et Composants Pour L'Industrie Automobile, Audincourt, France

[21] Appl. No.: 333,671

[22] Filed: Apr. 6, 1989

[30] Foreign Application Priority Data

Apr. 7, 1988 [FR] France ............................. 88 04621

[51] Int. Cl.⁵ .............................................. B60N 1/10
[52] U.S. Cl. ................................... 297/378; 296/65.1; 297/232; 297/379
[58] Field of Search ............... 297/379, 378, 232, 118, 297/63, 64, 65, 66, 62, 257; 296/65.1

[56] References Cited

U.S. PATENT DOCUMENTS

| | | | |
|---|---|---|---|
| 2,677,574 | 5/1954 | Golubics | 297/335 X |
| 3,316,013 | 4/1967 | Abel et al. | 297/232 |
| 3,550,949 | 12/1970 | Bonnaud | 297/379 |
| 4,475,763 | 10/1984 | Hamatani et al. | 296/65.1 |
| 4,869,541 | 9/1989 | Wainwright | 296/65.1 |

FOREIGN PATENT DOCUMENTS 0161157 11/1985 European Pat. Off. .
854249 11/1952 Fed. Rep. of Germany ...... 297/257

Primary Examiner—Peter R. Brown
Attorney, Agent, or Firm—Sughrue, Mion, Zinn, Macpeak & Seas

[57] ABSTRACT

The seat comprises a cushion foldable about its front edge and two side-by-side backrests. The two backrests (1 and 2) are carried by a horizontal rod (16) connected by an articulated link (18) to a fixed support (20). One of the backrests (2) is connected in its lower part to a rotative element (28) rotatable about the pivot axis of the horizontal rod. The other backrest (1) is free to pivot about the rod so that it may be folded over alone onto the cushion of the seat by this pivoting while it is capable of being folded over with the other backrest (2) onto the floor by pivoting therewith about the pivot axis X—X of the rod carrying the backrests.

9 Claims, 3 Drawing Sheets

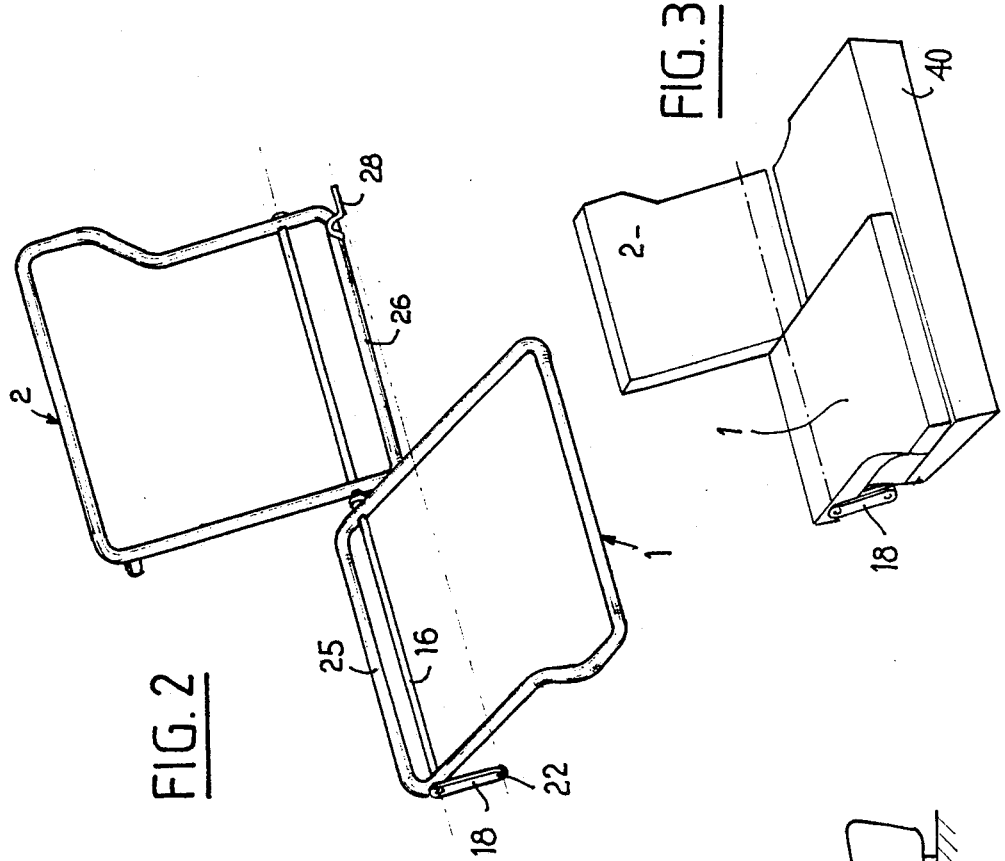

FOLDABLE SEAT AND IN PARTICULAR A REAR SEAT OF A MOTOR VEHICLE

Background of the Invention

Some vehicles, and in particular vehicles provided with a rear door, are more and more often equipped with rear seats the cushion and the backrest of which are independently articulated to the body so as to be capable of being folded over to a withdrawn position behind the front seat and thereby provide additional room for transporting luggage and merchandise, this additional room usually increasing the volume of the luggage compartment.

In the conventional manner, in this case, the cushion is articulated by its front edge while the backrest is articulated by its lower edge. The cushion may consequently be raised to a vertical position against the backrest of the front seat while the backrest is folded forwardly to a horizontal position behind the cushion. The additional amount of available room is considerable, but the rear seat is completely eliminated, which often limits in an inacceptable manner the number of passengers able to take a seat in the vehicle.

In order to improve the flexibility of utilization, it is now increasingly appreciated to be able to divide the rear space in such manner as to retain a seat for a passenger while increasing the volume available for the luggage. It has therefore been proposed to provide the rear seat with two separate backrests both of which are capable of being folded over and to provide each one with an articulation device on each side.

This arrangement has been found to be practical but costly.

Summary of the Invention

An object of the present invention is to overcome this drawback by providing a foldable seat comprising two side-by-side backrests and allowing the folding over of one thereof onto the cushion, the arrangement of the seat being particularly simple and consequently cheap.

The invention therefore provides a foldable seat, and in particular a rear seat of a motor vehicle, comprising a cushion and two side-by-side backrests each provided with means for locking in a substantially upright position of utilization, in which the two backrests are carried by a common rod which is pivotable between a substantially upright position of utilization of the seat and a position of the folding over of the two backrests, one of the backrests being pivotally mounted on said rod.

According to another feature of the invention, the seat comprises means preventing the displacement of the backrest pivotally mounted on the rod when the rod is in the position corresponding to the complete folding over of the backrest.

With this arrangement, the two backrests may be together shifted about the pivot axis of the rod carrying them so as to be folded over behind the cushion or put in a substantially upright position, while the pivotal backrest may be shifted alone about the axis constituted by said rod for folding over onto the cushion, the other backrest then remaining in the position of utilization by a passenger.

The control of these movements is achieved very simply with no special means or complex articulation device.

The following description of an embodiment, given as a nonlimitative example and shown in the accompanying drawings, will bring out the features and advantages of the invention. In the drawings:

Brief Description of the Drawings

FIG. 2 is a view of the frames of the two backrests in the position of utilization and position folded over onto the cushion respectively.

FIG. 3 is a perspective view of the seat in this position.

FIG. 4 is a diagrammatic side elevational view of the seats of a motor vehicle comprising the seat according to the invention.

Description of A Preferred Embodiment

Figure 1:
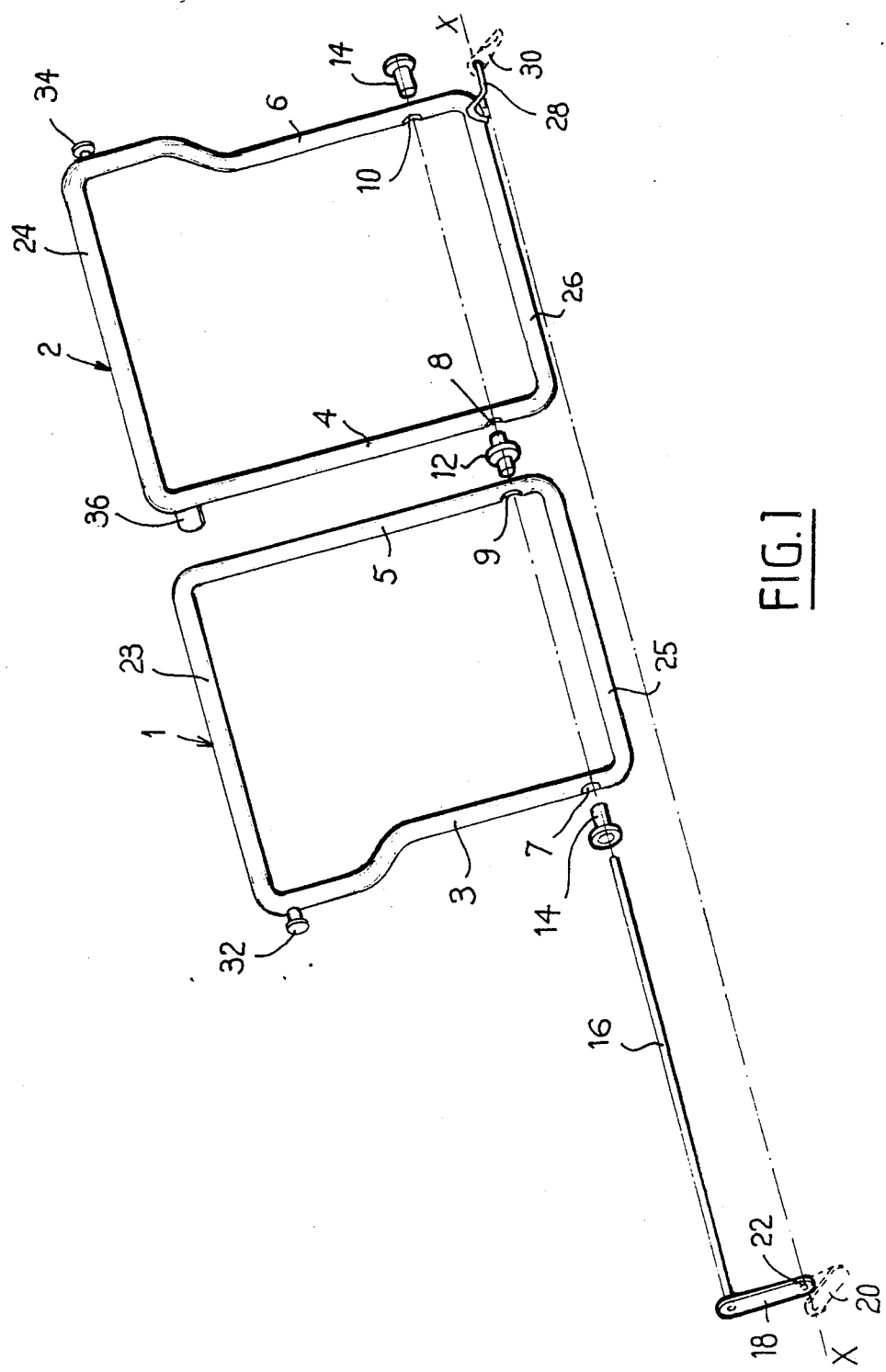
FIG. 1 is an exploded perspective view of the frames of two backrests of a seat according to the invention.

The foldable seat according to the invention comprises two independent backrests placed side by side and preferably formed by a frame the essential element of which is constituted by a substantially rectangular frame structure 1 and 2 respectively. Each of the frame structures 1 and 2 comprises two lateral opposed tubes or bars respectively 3 and 5 and 4 and 6 which are provided in their lower part with facing throughway apertures 7, 9 and 8, 10. Mounted in each of these apertures is a support bearing 12, 14 for a horizontal rod 16 connected by a link 18 articulated at both ends to a support 20 fixed to the floor of the vehicle. The rod 16 is therefore pivotable about an axis X—X materialized by its articulation pin 22 on the support 20.

The upper bars 23 and 24 of the two frame structures 1 and 2 are substantially in alignment. On the other hand, the lateral bars 3 and 5 of the frame structure 1 are shorter than the lateral bars 4 and 6 of the frame structure 2 so that the lower bar 25 of the frame structure 1 is spaced a greater distance away from the pivot axis X—X than the lower bar 26 of the frame structure 2. The latter is moreover connected to the bent end of a rod 28 which is coaxial with the axis X—X and pivotable about said axis X—X in a support 30 fixed to the floor of the vehicle.

The frame structures 1 and 2 are each provided in their upper part with a lug 32, 34 for locking to the body of the vehicle, the two lugs being carried by the remote vertical bars 3 and 6 of the two frame structures. Moreover, the vertical bar 4 of the frame structure 2 carries a tab 36 which extends laterally to behind the vertical bar 5 of the frame structure 1.

In the normal position of utilization of the seat, the two backrests, and in particular the frame structures 1 and 2, are carried by the rod 16 which is in the substantially upright position i.e. the position shown in FIG. 1, the link 18 being substantially vertical. The lugs 32 and 34 are locked to the body so that the two backrests are immobilized in a substantially vertical position.

When it is desired to fold over one of the backrests while retaining a part of the seat available for a passenger, it is sufficient to unlock the lug 32 connected to the frame structure 1 and to push this frame structure forwardly. As it is free to pivot on the rod 16, it easily swings over onto the cushion 40. The seat then comprises, as shown more particularly in FIGS. 3 and 4, a backrest 2 which is in the substantially upright normal position and a backrest 1 folded over onto the cushion. This seat consequently provides a normal place for a passenger owing to the combination of the substantially upright backrest 2 and the portion of the seat 1 which remained uncovered. On the other hand, on the other side of this seat, the folding over of the backrest 1 clears a space for the stacking of luggage or merchandise.

The backrest 1 is shifted to its substantially upright position in a manner as simple as its folding over by the pivoting of the frame structure 1 about the rod 16 and then the locking of the lug 32 to the body.

Figure 5:
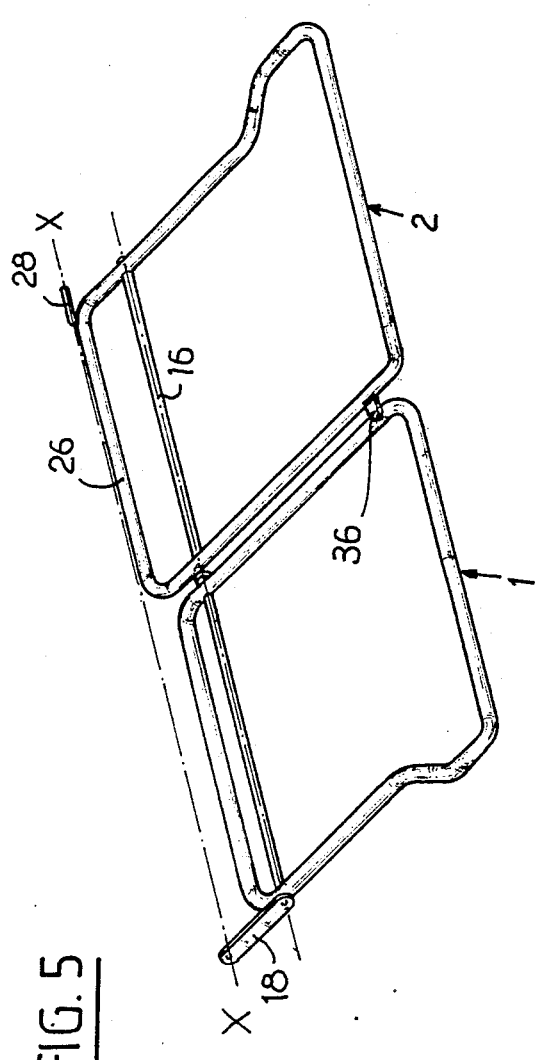
FIG. 5 is a view similiar to FIG. 2 of the frames of the two backrests in the fully folded over position.
Figure 6:
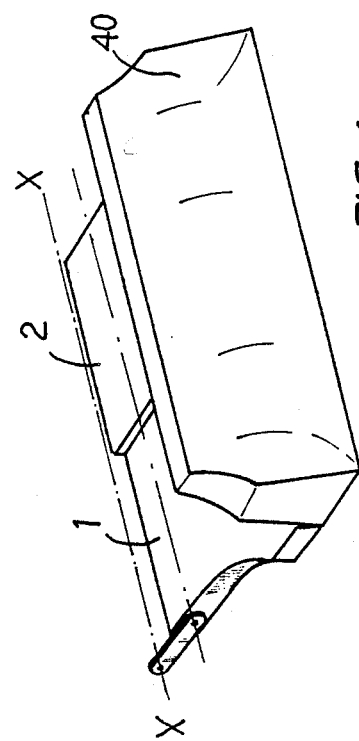
FIG. 6 is a perspective view of a folded over rear seat.
Figure 7:
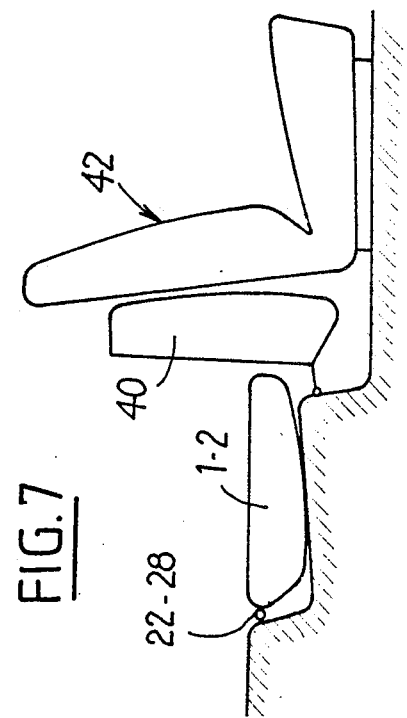
FIG. 7 is a diagrammatic side elevational view of the seats of a motor vehicle in this position.

When it is not envisaged to transport a passenger and it is on the contrary desired to have available the maximum amount of space for the luggage or merchandise, it is of course possible to fold over the cushion 40 in the conventional manner on its front edge and place it in a vertical position behind the front seat 42 of the vehicle, as shown more particularly in FIGS. 6 and 7. The whole of the backrest can then be folded over onto the floor by unlocking the lugs 32 and 34 and then exerting a thrust on the upper part of the backrest 2 and cause its pivoting. This thrust is transmitted by the tab 36 to the backrest 1 so that the two backrests pivot together As the lower bar 26 of the frame structure 2 is connected to the rod 28, it turns about the axis X—X of the latter in the same way as the assembly of the two backrests. Thereafter, the latter and the rod 16 and the link 18 simultaneously turn about the articulation pin 22 mounting the link 18 on the support 20 and about the axis of the rod 28, i.e. the axis X—X. They move between the substantially upright position of utilization represented in FIG. 1 and the folded over position on the floor of the vehicle shown in FIGS. 5, 6 and 7. In the latter position, the folded over backrests maximize the amount of room behind the front seat 42 of the vehicle.

When the backrests are shifted to their substantially upright position, the latter again pivot about the axis X—X and carry along therewith the rod 16 until the link 18 resumes its vertical position, which corresponds to the substantially upright position of utilization of the two backrests. As shown in FIG. 5, tab 36 prevents backrest 1 from being independently returned to its upright position; that is, when backrest 1 is returned backrest 2 is carried with it to the upright position.

Owing to this arrangement, the backrest 1 is able to pivot either alone about the axis formed by the rod 16 for folding over onto the cushion, or simultaneously with the backrest 2 about the axis X—X, i.e. about a second axis offset relative to the first axis, so as to be folded over at the same time as the second backrest onto the floor of the vehicle. The distance between the two axes, i.e. the length of the link 18, substantially corresponds to the thickness of the cushion and these two axes are of course exactly parallel to each other.

As these axes are materialized, one by a pivotal rod and the other simply by an articulation pin and a small rotative rod, the whole of the device is extremely simple to construct and particularly cheap. Furthermore, it is extremely reliable, since it has no complex element liable to get out of order or deteriorate in use.

What is claimed is:

1. A foldable seat, and in particular a rear seat to be mounted on the floor of a land motor vehicle, said seat comprising:
   a seat cushion (40) mounted on said floor;
   a first and a second backrest are placed in a side-by-side position and which are separately movable between a substantially upright position of utilization and a substantially folded position, and each having a separate frame (1, 2) with respective two lateral opposite sides (3,5; 4,6) and upper and lower sides (23–24; 25–26);
   a single, common, substantially horizontal rod means (16) for carrying said lateral sides (3,5; 4,6) of both frames and for pivotally mounting only said frame (1) of said first backrest for pivotal movement about said rod means between said substantially upright position of utilization and said substantially folded position;
   supporting means (18) for supporting said single rod means (16) and pivotally mounted on said floor to be movable about a single, common pivot axis (XX), spaced and substantially parallel to said rod means (16), between an upper first position, where both of said backrests are held in said substantially upright position so that said seat can be utilized, and a lower second position where both of said backrests are in their respective substantially folded positions; and
   separate means (32, 34) provided on each said frame (1, 2) for locking the corresponding backrest to the motor vehicle in said substantially upright position.

2. Seat according to claim 1, wherein only said first backrest is free to pivot on said single rod means (16), when said single rod means is in said upper first position, for the purpose of folding over said first backrest onto said cushion, and further comprising means (36), associated with one of said backrests to prevent pivoting movement of said first backrest about the rod means (16) from said folded position to said substantially upright position when said supporting means is in said lower second position and both of said backrests are in said folded position.

3. Seat according to claim 1, wherein each of said backrests comprises a rectangular frame structure having two opposed sides, said single rod means extending through said two opposed sides.

4. Seat according to claim 3, comprising an element (28) which is rotatable about said pivot axis (XX) of said rod means (16), only said second backrest having a lower side (26) connected to said element (28).

5. Seat according to claim 1, wherein said supporting means comprises an articulated link (18) connecting said rod means (16) to said floor.

6. Seat according to claim 1, further comprising means (36), associated with one of said backrests for interconnecting both of said two backrests during pivoting movement thereof about said pivot axis (XX) of said single rod means (16).

7. Seat according to claim 6, wherein the means for interconnecting the two backrests comprises a tab (36) which comes to bear against said first backrest and which is fixed to a side (4) of said second backrest.

8. Seat according to claim 1, comprising a cushion which is capable of being folded over, from a position of utilization to a substantially vertical upright position, about a front edge of the cushion, said first backrest capable of being both folded over alone onto said cushion in the position of utilization thereof and also simultaneously folded over with said second backrest onto the floor behind the cushion in the the substantially vertical upright position.

9. Seat according to claim 1, wherein said pivot axis (XX) is spaced from said rod means (16) by a distance substantially corresponding to the thickness of said seat cushion (40).

* * * * *